United States Patent Office 3,468,862
Patented Sept. 23, 1969

3,468,862
POLYBUTENE-1 FILM AND ITS ORIENTATION PROCESS
Ronald S. Schotland, New York, N.Y., assignor to Mobil Oil Corporation, a corporation of New York
No Drawing. Filed June 25, 1965, Ser. No. 467,088
Int. Cl. C08f *47/14;* B29d *7/24*
U.S. Cl. 260—93.7         11 Claims

ABSTRACT OF THE DISCLOSURE

Novel oriented crystalline polybutene-1 films having superior physical properties and clarity. These films are prepared by rapidly cooling or quenching an extruded film of polybutene-1 from the molten condition to a temperature (e.g., preferably below 0° C.) low enough to substantially prevent rhombohedral crystallization in the film and orienting the film uniaxially or biaxially at preferred temperatures of about 30 to 60° C. by subjecting the film to a stretching operation which is initiated prior to any significant formation of rhombohedral crystals. During actual stretching, metastable tetragonal (form II) crystals which formed during either the quenching or the heating the film to stretch temperature are largely transformed into stable rhombohedral (form I) crystals and the presence of the latter is unobjectionable at this stage.

---

The present invention relates to a method of preparing an oriented polybutene-1 film and to the resulting novel oriented products which have superior physical properties. It is particularly concerned with the orientation of polybutene-1 films containing polymers of a normally crystalline type in order to produce new biaxially oriented films having enhanced clarity and strength.

Polyolefin films are currently being produced in enormous quantities as wrapping materials. Various characteristics are sought in these wrapping films depending upon the particular utilization. In general, a high degree of clarity or freedom from haziness is prized and substantial tensile strength is also usually desired. For some purposes, stiffness in the film, as indicated by increased tensile moduli is sought and often a relatively low elongation at break is desirable. In addition, for certain uses such as the wrapping of meats, a relatively high degree of permeability to oxygen is necessary. There is a continuing demand for improvement in films in respect to one or more of the aforesaid characteristics.

Unoriented films of crystalline polybutene-1 lack clarity and have limited tensile strength. Previous efforts to improve these qualities have been unsuccessful. On crystallizing from the melt during gradual cooling to room temperature, much of the polybutene-1 assumes a metastable tetragonal crystal structure known as form II (115° C. crystalline melting point), practically all of which upon prolonged standing at normal room temperature conditions undergoes a crystal-crystal transformation to a stable rhombohedral structure designated as form I (124° C. crystalline M.P.). Attempts to introduce orientation into polybutene-1 resin by stretching films which already had a stable form I crystal morphology along with a relatively high crystalline content have yielded films possessing unacceptable tensile and optical properties. Other efforts to process polybutene-1 films containing large crystal aggregates of the form II structure into oriented films were unsuccessful because high stretch elongations could not be attained.

It has now been discovered that polybutene-1 films may be successfully oriented under certain carefully controlled conditions to yield products of greater and stable clarity as well as other improved physical characteristics including greater tensile strength, tensile modulus and dimensional stability along with substantially higher permeability to the passage of oxygen therethrough.

This orientation is accomplished according to the present invention by a process which comprises quenching a substantially molten polybutene-1 film sufficiently to solidify or harden said film and thereafter subjecting said film while in substantially the same crystalline morphological condition as its quenched state to sufficient stretching to produce a film of improved and stable clarity. The invention also encompasses the resulting oriented film which desirably has a haze value below about 20% per mil of thickness measured by the ASTM procedure mentioned hereinafter, a tensile modulus of at least about 24,000 pounds per square inch (p.s.i.), and an ultimate tensile strength of at least about 8000 p.s.i. along with substantially greater dimensional stability and substantially greater permeability to oxygen than unoriented polybutene-1. Unoriented material undergoes greater dimensional changes before stability is attained.

Narrower aspects of the invention relate to one or more of such process features as preferred temperature ranges for quenching and stretching the films, the degree of biaxial orientation, processing a continuous web or film in a continuous sequence of operations, a postannealing operation after stretching, and the degree of stretching which may amount to about a 150% or higher (and preferably to at least about 300%) elongation of the original linear dimension. For example, a film may desirably be stretched 500% whereby each foot length of film is extended to a length of 6 feet.

The present process is applicable to normally crystalline polybutene-1, as exemplified by the stereoregular resin which contains both crystalline and amorphous material at normal room temperature. For most applications, the higher the isotactic index of the polybutene the better, but films from resins having lower indexes may be substantially improved by the new treatment.

Crystallization is restrained or controlled within the resin from the time the film is formed or extruded until it is subjected to the stretching operation. This is achieved by rapidly cooling or quenching the substantially molten article to a temperature sufficiently low to solidify the resin, that is harden the material enough so that it is no longer readily deformable but has sufficient dimensional stability for normal commercial processing even at high production rates. For example, there is no appreciable stretching of the film under tensions in the range of about 0.5 to 3 ounces per inch of width of the film web as employed in some film machinery. The expressions "molten" and "substantially molten" are used herein to describe an amorphous resin in a softened or plastic condition but still sufficiently viscous or cohesive to retain its sheet form and approximate dimensions under the influence of gravity. The hot extruded film is customarily at or somewhat below the actual sheet forming or extrusion temperature and usually well above the crystalline melting points of the crystal forms of polybutene-1. In so restraining crystallization by the aforesaid quenching, certain effects are noted. First, the formation of the rhombohedral crystals (form I) is eliminated or at least reduced to such an insignificant extent that their presence has not been observed at the quenching temperature. Secondly, the quenching leads to small crystallites and reduces the average size of any aggregates formed by crystals of the tetragonal type (form II) considerably below that of the crystal aggregates occurring in a resin which is slowly cooled to room temperature as evidenced by the much greater clarity of the quenched film. Also, in at least some instances, all crystallization is inhibited, for when the same resin melt is instantaneously chilled to a temperature of about −196° C. in liquid nitrogen, the resin apparently remains in the amorphous state for no crystal formation is observed.

The film may be quenched in the air at atmospheric or ambient temperatures, such as 25° C.; but quenching in cold water, at say 5 or 10° C., is often preferred, especially in the handling of thicker extruded films (e.g., films of 3 to 5 mils gauge) where the dissipation of heat from the central layers of the film is retarded by the low heat transfer characteristics of the external strata. Superior results are obtainable by quenching at temperatures of about 0° C. and below. In general, the lower the quenching temperature, the better the results in controlling crystallization.

Quick cooling or quenching is important, as it has been found that samples of a polybutene-1 melt cooled slowly and gradually in a hydraulic press from a temperature of the order of 190° C. to room temperature over a period of 3 minutes sometimes display mediocre to poor haze characteristics after stretching at various temperatures except for samples stretched at 110° C.— a stretch temperature which is undesirably high for certain applications. On the other hand, good haze and gloss characteristics were consistently obtained with films of the same material quenched to 0° C. from temperatures of around 190° C. by immersion in ice water and thereafter stretched at temperatures ranging from room temperature up to 110° C. This improvement in optical and processing qualities may be attributed in part to the lower temperature of ice water but perhaps chiefly to the rapid rate of cooling the plastic material therein.

The quenched film will customarily be stretched without substantial delay to orient it. However, it appears that the quenched material may be stored indefinitely at a temperature of 0° C. or lower before stretching without adverse effect on the eventual orientation as the morphological state achieved by quenching is preserved at the low storage temperature. For stretching, the quenched film should be preheated where necessary to the selected stretching temperature. This usually takes only a brief interval which is not long enough to permit transformation of tetragonal crystals to rhombohedral crystals, for that transformation requires considerably more than a few minutes to proceed to any substantial extent at the usual stretching temperatures. The article may be stretched at temperatures ranging from about 25 to 110° C. but a temperature between about 30° C. and 60° C. is greatly preferred. Below the latter range, the polymer bulk viscosity is so high that high stretch elongations are difficult to achieve. Above about 60° C. "line drawing" problems are often encountered, and above 110° C. the stretched films usually have an undesirably low gauge due to excessive viscous flow.

The stretch rate does not seem to have a significant effect on the properties of the stretched film, but stretch elongations are important as optical and other physical properties of the film show increasing improvement with an increase in the stretch elongation. A stretch or increase of at least 150% in the length of other dimension of the quenched film is generally suitable for obtaining substantial benefits according to the invention. However, stretch elongations of about 300% or higher are usually preferred, particularly those above 500%, for optimum results, and there are indications that sretches of 700% or more can be achieved on suitable equipment.

A film or sheet is usually stretched equally in two mutually perpendicular directions to achieve a balanced structure having the biaxial orientation that is desired for many purposes. Two stretches may be performed simultaneously, as exemplified by stretching a tubular film by injection of an inert gas inside the tube, or they may be carried out in two stages. In sequential stretching operations, the final or second stretch tends to influence the orientation of the article considerably more than the first stretch.

As an optional, but often desirable expedient after stretching, the film may be postannealed or conditioned at the stretching temperature while the film is still constrained. Higher temperatures are also contemplated for this heat setting operation, but the temperature level should not be increased to the point where disorientation of the resin occurs. Only a relatively brief conditioning period ranging from a few seconds to a few minutes is usually required. This treatment reduces the amount of snapback shrinkage in the film, evidently by "locking in" the oriented structure. Also the gloss of the surface of the article appears to be distinctly improved, perhaps by a reduction in the number or size of microvoids therein.

A substantial alteration of the crystalline structure within the resin takes place during the stretching operation. At the beginning, the resin is substantially free of rhombohedral crystals, but it does contain a substantial proportion of tetragonal crystals in relatively small crystal aggregates which were formed either during the quenching operation or as a result of preheating the quenched film above —6° C., for even in the case of an article maintained in the amorphous state by quenching with liquid nitrogen, a significant amount of the tetragonal form II crystals is formed when the supercooled film is heated above —6° C. preliminary to stretching. In general, the lower the total percent crystallinity by weight and the smaller the crystal aggregate size in the resin at the start of the stretching, the better the results. During the stretching a substantial proportion, and preferably a major proportion (i.e. more than half), of the form II material is converted into rhombohedral form I crystals. The percentage of crystal conversion depends on the stretch elongation and the stretch temperature. In some instances wherein the higher stretch elongations are employed, a major portion of the form II material is apparently rapidly converted into form I during the stretching process. In addition, a significant increase in the total crystalline content occurs during the stretching period. In the preferred stretching operation, the stretch elongation and temperature are adjusted to increase the total percent crystallinity of the resin by at least one-third during stretching. Stretch temperatures in the range of about 20 to 60° C. are suitable for this particular purpose. The magnitude of the increase in total percent crystallinity during this operation is dependent on the magnitude of the stretch elongation; hence the total crystallinity increase here may be adjusted upward or downward by increasing or decreasing the degree of stretching.

In many cases the film immediately after stretching contains both form I and form II crystals; and then it is usually evident that the conversion of form II to form I crystals continues at room temperatures, sometimes to a very substantial extent for a few hours after stretching at a relatively rapid rate and often for a week or two more at a decreasing conversion rate. These poststretch conversion rates are usually markedly faster in films of low elongation than in the case of highly elongated films where the rate may sometimes become imperceptibly slow a short while after stretching. In sharp contrast with this, the conversion of form II into form I crystals in an unquenched and unoriented polybutene-1 film at similar temperatures occurs gradually at a rate far slower than that occurring during the stretching step of the novel process; moreover, the increase in total crystallinity in the unquenched unoriented material is not sudden like that taking place in said stretching step.

A small but highly significant increase of about 1 to 2.5% or more in the density of the resin occurs during the brief stretching operation; and the degree of such immediate densification depends on and increases with an increase in the stretch elongation. Afterward an unusual effect is noted in that the density generally increases for only a few hours at a slower but nevertheless considerable rate at room temperature before a substantially constant density is attained. A similar increase in the density of an unoriented film of the same resin also takes place but only gradually over a period of days before the final density is reached at a rate much slower than either during the stretching or poststretch aging of the oriented material. Density changes are a measure of dimensional instability in such cases. Thus, the desired degree of stretch may also be described as sufficient to increase the density of the article by at least about 1%, and preferably at least about 2.5%, during stretching. It is generally desirable to attain dimensional stability in the article as quickly as possible and preferably during processing under controlled conditions rather than later in a warehouse. Consequently, it is usually recommended that as much of the densification as conveniently possible, preferably more than half, be accomplished during the stretching by suitable adjustment of the stretch conditions, particularly the stretch elongation. This minimizes subsequent shrinkage in the roll of film produced and thus facilitates immediate printing, laminating, trimming or other subsequent processing in which dimensional changes are a problem.

The resulting thermoplastic polybutene films are biaxially or uniaxially oriented to a substantial degree. They possess physical properties, especially in respect to optical and mechanical qualities, which are far superior for most purposes to those of unoriented resins of the same composition. For example, in the case of oriented films the haze value is below about 20% per mil of thickness and values below 8% are readily obtainable in processing. Similarly, the important tensile moduli are higher, ranging from 24,000 p.s.i. upward, and preferably amounting to at least 30,000 p.s.i., depending upon the stretch elongation and the period of aging after stretching. Also tensile strengths are increased and amount to at least 8000 p.s.i., and preferably to at least 10,000 p.s.i. The new films also have a significantly higher permeability to gases, such as oxygen, which is a highly desirable characteristic for many packaging uses. There are also indications that the permeability may be increased even more by increasing the stretching elongation. Again, the dimensional changes occurring in the new products after stretching are distinctly less.

The instant process is suitable for large scale continuous operations using conventional equipment. For illustration, in the production of film, a polybutene-1 resin melt at a temperature of 190° C. which, of course, is substantially above the crystalline melting points of the polymer, is extruded under high pressure through a die having an orifice slot. The extruded material is then quenched by passing it without delay into a bath maintained at the selected temperature. For illustration, the bath may be made up of cold water at say 10° C. or a liquid at a temperature of —10° C., such as ethanol or ethylene glycol alone or mixed with water, or a still colder slurry or solution of Dry Ice in acetone. Alternatively, the chilling may be produced by spraying a cold liquid of the aforesaid nature onto a moving web of extruded film. Also, it is contemplated that the quenching may be performed on a chilled roll having one of the aforesaid cooling media circulation through the interior thereof.

After the rapid quenching operation, the film is preheated to a stretching temperature of 50° C. while the web is passing through an oven heated by circulating hot air or by radiant elements or other suitable means.

Next, the film is biaxially oriented by stretching first longitudinally while it passes between two sets of nip rolls with the second pair of rolls rotating at a linear speed of about 4 to 6 times the speed of the first pair of nip rolls. The film may then be stretched laterally to the same elongation of 300 to 500% in a conventional tenter or other device for imparting a transverse stretch to film. Both the stretching nip rolls and the tenter are enclosed in a suitable oven or provided with other means for keeping the film at 50° C. After stretching, the tenter maintains the film in the stretched condition at 50° C. for an additional period of less than a minute as a postconditioning heat treatment; then tension is released and the film is withdrawn for subsequent processing, including trimming, etc. Although the characteristics of the resulting oriented film undergo certain changes for a limited time as described herein; these alterations are generally of a beneficial nature and the dimensional changes occurring then are small enough to pose no special problems in the storage and marketing of the film.

For a better understanding of the nature and objects of this invention, reference should be had to the following illustrative examples in which polybutene-1 is oriented in laboratory equipment.

EXAMPLES

Petro-Tex® No. XB-100 isotactic polybutene-1 manufactured by the Petro-Tex Chemical Corporation is employed in all examples. This stereoblock polymer containing very small amounts of stabilizing additives is prepared by Ziegler-Natta catalysis. It has an intrinsic viscosity of 1.52 at 60° C. in n-heptane and a melt index of 0.45, corresponding to a number average molecular weight of approximately 54,000. It is 96% insoluble in boiling ether and the ash content does not exceed 160 parts per million.

Eight grams of this resin in pellet form are placed between two sheets of 1.5 mil aluminum foil and the foil assembly is placed in a mold previously preheated to 190° C. The resin is allowed to melt before a pressure of 7,000 pounds per square inch is applied in a hydraulic press during a period of one minute. After holding this pressure for two additional minutes, the press is quickly opened and the aluminum-polymer sandwich is quenched at —50° C. in an acetone Dry Ice bath. The aluminum foil is then stripped off the resin and the resulting 15 mil plaque is cut into a 2″ x 4″ test strip and stored in Dry Ice to eliminate any further crystallization and minimize or prevent any appreciable crystal transformation in the interval between film preparation and stretching.

The film samples are preheated in circulating air ovens and subjected to stretching into mutually perpendicular directions in a T. M. Long Laboratory Stretcher and thereafter subjected to the various physical tests described in the following tables in each stretch direction. Unless otherwise stated, each sample is preheated for 60 seconds, stretched and finally postannealed for 60 seconds all at 40° C.

TABLE 1.—POSTSTRETCH CRYSTAL RATIOS IN BIAXIALLY ORIENTED FILMS

| Stretch Elongation | | Stretch Rate, in./sec. and percent/min: | | Form II: Form I Ratio at Intervals (Hours After Stretching) | | | | | |
|---|---|---|---|---|---|---|---|---|---|
| 1st SD | 2nd SD | 1st SD | 2nd SD | 0 | 2 | 5 | 24 | 168 | 338 |
| 150% | 150% | 10″/sec.; 30,000%/min. | 10″/sec.; 15,000%/min. | 1.71 | 1.30 | 1.16 | 0.97 | 0.74 | 0.68 |
| 200% | 200% | do | do | 1.26 | 1.00 | 0.82 | 0.64 | 0.56 | 0.49 |
| 300% | 300% | do | do | 0.58 | 0.47 | 0.40 | 0.38 | 0.29 | 0.30 |

NOTE.—SD designates stretch direction.

Table 1 sets forth the relative proportions by weight of form II tetragonal crystals to form I rhombohedral crystals in terms of $I_{12°}:I_{10°}$ ratios uncorrected for orientation effects. $I_{12°}$ and $I_{10°}$ represent the X-ray diffraction intensities from selected form II and form I diffraction planes, respectively.

It is apparent from the tabulated ratios that a substantial and sometimes a major proportion of the form II crystals are converted into form I material during the brief 40° C. stretching operations. These data also show that higher stretch elongations increase the transformation of form II crystals into the form I structure during stretching and that upon aging at room temperature further conversion often takes place. However, the rate of conversion after stretching diminishes with the passage of time and observations several months later indicate that the oriented film retains a small percentage of tetragonal crystals indefinitely. Infrared absorption data confirm the continuation of the crystal-crystal transformation after stretching of the film. In addition, the crystal transformation is influenced by the stretch temperature for it is found that an increase in the stretch temperature reduces the conversion of form II into form I crystals during stretching. Other data indicate that with higher stretch elongations coupled with low stretching temperatures, it is possible to convert practically all of the tetragonal form II crystals into form I structure in the actual stretch operation.

In addition, the total X-ray crystallinity of various samples increases markedly for a few hours, perhaps one to five hours, after stretching and then becomes substantially constant. For example, average values for film samples stretched 150% in two directions indicate that a crystallinity increase from about 35% to 41% occurs during aging while films stretched 200% biaxially increase similarly to about 42% crystallinity and those stretched 300% biaxially also increase to reach an average of 49% total crystallinity.

Inasmuch as the ratio of form II to form I crystals, the density and the crystallinity of the polybutene-1 films all reach practically constant values within 24 hours after stretching, the fact that the tensile modulus tends to increase beyond this period indicates that there must be some secondary crystallization causing bridging between existing crystallites, which continues after the first 24 hours. X-ray data of a qualitative nature further indicate TABLE 2.—PROPERTIES OF BIAXIALLY ORIENTED FILMS—150% x 150% STRETCH
[1st stretch, 150%—15,000%/min.; 2nd stretch, 150%—7,500%/min.]

| | Density, g./cc. | Ultimate Tensile Strength, p.s.i. | | Ultimate Elongation, percent | | Tensile Modulus, p.s.i. | | Rupture, ft. lbs./ cu. in. | | Haze,* percent per mil |
|---|---|---|---|---|---|---|---|---|---|---|
| | | 1st SD | 2nd SD | 1st SD | 2nd SD | 1st SD | 2nd SD | 1st SD | 2nd SD | |
| Hours after stretching: | | | | | | | | | | |
| 0 | .8920 | 10,700 | 10,600 | 148 | 185 | 17,900 | 16,300 | 732 | 892 | 10.3 |
| 2 | .8940 | | | | | 20,500 | 18,500 | | | 10.3 |
| 5 | .8983 | | | | | 21,000 | 17,800 | | | 10.3 |
| 24 | .9007 | | | | | 22,700 | 20,000 | | | 10.0 |
| 168 | .9009 | 10,700 | 11,300 | 160 | 155 | 29,800 | 26,400 | 799 | 861 | 10.3 |

*Haze values determined according to ASTM Test D-1003-52 using Gardiner Photometer.
NOTE.—SD designates stretch direction.

TABLE 3.—PROPERTIES OF BIAXIALLY ORIENTED POLYBUTENE-1 FILMS—300% x 300% STRETCH
[1st stretch, 300%—75,000%/min.; 2nd stretch, 300%—37,500%/min.]

| | Density, g./cc. | Ultimate Tensile Strength, p.s.i. | | Ultimate Elongation, percent | | Tensile Modulus, p.s.i. | | Rupture, ft. lbs./ cu. in. | | Haze,* percent per mil |
|---|---|---|---|---|---|---|---|---|---|---|
| | | 1st SD | 2nd SD | 1st SD | 2nd SD | 1st SD | 2nd SD | 1st SD | 2nd SD | |
| Hours after stretching: | | | | | | | | | | |
| 0 | .8975 | 12,100 | 13,200 | 92 | 110 | 24,000 | 23,900 | 529 | 700 | 7.5 |
| 2 | .8985 | | | | | 28,500 | 25,300 | | | |
| 5 | .9005 | | | | | 31,200 | 29,500 | | | |
| 24 | .9015 | | | | | 32,900 | 30,200 | | | |
| 168 | .9018 | 12,100 | 13,200 | 70 | 118 | 38,000 | 34,800 | 404 | 704 | 7.6 |

* See footnote at end of Table 2.

Tables 2 and 3 depict a number of striking characteristics in the films of the present invention. The average density of the quenched films of 0.875 g./cc. which increases suddenly during stretching, continues to increase more gradually at room temperature for a few hours; then the density becomes and remains substantially constant. This is indicative of good stabilization as a result of the orienting operation particularly at the higher elongation, coupled with relatively quick attainment of full dimensional stability. There is also a large and very desirable increase in the tensile modulus after the stretch, and while this rate of increase begins to taper off considerably after the first few hours, it continues for about two weeks. However, the ultimate tensile strength, the elongation at break and the haze values apparently do not change significantly after the stretching operation.

that orientation exists in these films, and that this orientation progressively increases during the poststretch aging period.

The data in Tables 1, 2, and 3 also demonstrate that higher stretch elongations produce higher values of clarity, crystallinity, tensile modulus, and tensile strength, coupled with lower ultimate elongations in these films.

TABLE 4.—COMPARATIVE FILM PROPERTIES

| Property | Stretch Direction | Commercial Meat Wrapping Film [1] | Biaxially Oriented Polybutene-1 | | Unoriented Polybutene-1 [4] |
|---|---|---|---|---|---|
| | | | 550% x 225% Stretch [2] | 300% x 300% Stretch [3] | |
| Haze* | | 6.7%/mil | 4.2%/mil | 7.3%/mil | 30-40%/mil |
| Tensile Modulus | 1st | 18,000 p.s.i. | 49,000 p.s.i. | 32,900 p.s.i. | 18,000 p.s.i. |
| | 2nd | 16,000 p.s.i. | 24,000 p.s.i. | 30,200 p.s.i. | |
| Ultimate Tensile Strength | 1st | 1,800 p.s.i. | 25,000 p.s.i. | 10,400 p.s.i. | 4,800 p.s.i. |
| | 2nd | 1,400 p.s.i. | 9,000 p.s.i. | 11,300 p.s.i. | |
| Ultimate Elongation | 1st | 350% | 50% | 60% | 340% |
| | 2nd | 400% | 365% | 95% | |

[1] Low density (0.92) polyethylene.
[2] Quenched at −50° C., stretched 5″/sec. at 60° C. and then aged 24 hours before testing.
[3] Quenched at −50° C., stretched 25″/sec. at 40° C. and then aged 24 hours after stretching.
[4] Sample aged 24 hours after melt crystallization.
*See footnote at end of Table 2.

The data of Table 4 afford a comparison of the characteristics of two oriented polybutene films of the present invention with both an unoriented film from the same polybutene-1 resin and with a widely used commercial polyethylene meat wrapping film. It is apparent that the novel biaxially oriented polybutene films are greatly superior in tensile moduli and tensile strengths to both comparative films. The clarity (lower haze value) of the new oriented films is not only far better than the unoriented polybutene-1 material but also exceeds the good optical quality of the commercial film when a high enough stretch elongation is employed in the novel process. From related data which are not included in Table 4 it is also found that the permeability of oriented polybutene films to the passage of gases is markedly higher than the permeabilities of both the unoriented polybutene-1 film and the commercial polyethylene film.

What is claimed is:

1. A process which comprises quenching a substantially molten polybutene-1 film to a temperature not above 25° C. and sufficient to solidify said film and to prevent substantial rhombohedral crystallization therein, and thereafter subjecting said film to an extension of at least 150% in at least one direction at a temperature between about 25 and 110° C. by stretching initiated while said film is substantially free of rhombohedral crystals in producing a film of improved and stable clarity.

2. A process according to claim 1 in which the quenching temperature does not exceed about 0° C.

3. A process according to claim 1 in which said film is biaxially oriented by stretching in two substantially mutually perpendicular directions.

4. A process according to claim 1 in which said film is stretched sufficiently to increase the density of said polybutene-1 by at least about 1% during said stretching operation.

5. A process according to claim 1 in which said film is maintained in stretched condition at substantially said stretching temperature immediately after stretching for a period sufficient to substantially reduce retraction in the stretched article.

6. An orientation process which comprises quenching a substantially molten, polybutene-1 film at a temperature not higher than about 0° C. to solidify said film and to prevent substantial rhombohedral crystallization therein, and thereafter subjecting said film to biaxial extensions of at least about 300% at a temperature between about 30 and 60° C. by stretching initiated while said film is substantially free of rhombohedral crystals, whereby the clarity, tensile strength and tensile modulus of the oriented film are substantially greater than in a corresponding unoriented film.

7. A process according to claim 6 in which said film is stretched sufficiently to increase the density of said polybutene-1 by at least about 2.5% during said stretching operation.

8. A continuous orientation process which comprises extruding a film from a thermoplastic melt of normally crystalline polybutene-1, quenching the substantially molten film at a temperature not greater than about 0° C. to solidify said film and to prevent substantial rhombohedral crystallization therein, and thereafter subjecting said film to biaxial extensions of at least about 500% at a temperature between about 30 and 60° C. by stretching initiated while said film is substantially free of rhombohedral crystals, whereby the clarity, tensile strength, tensile modulus, premeability to oxygen and immediate dimensional stability of the resulting oriented film are substantially greater than those of a corresponding unoriented film.

9. An oriented crystalline polybutene-1 film having a haze value below about 20% per mil of thickness, a tensile modulus of at least about 24,000 p.s.i. and an ultimate tensile strength of at least about 8000 p.s.i.

10. A biaxially oriented polybutene-1 film having a haze value below 20% per mil of thickness, a tensile modulus of at least 24,000 p.s.i., an ultimate tensile strength of at least 8000 p.s.i., and substantially greater permeability to oxygen than an unoriented film of the same composition.

11. An oriented polybutene-1 film having a haze value below about 8% per mil of thickness, a tensile modulus of at least about 30,000 p.s.i. and an ultimate tensile strength of at least about 10,000 p.s.i.

References Cited

UNITED STATES PATENTS

| | | | |
|---|---|---|---|
| 2,979,774 | 4/1961 | Rusignolo | 264—210 |
| 3,226,459 | 12/1965 | Tijunelis | 264—210 |
| 3,248,463 | 4/1966 | Wiley et al. | 264—210 |
| 3,271,495 | 9/1966 | Gronholz et al. | 264—210 |
| 3,132,027 | 5/1964 | Norton et al. | 260—93.7 |
| 3,145,111 | 8/1964 | Norton | 260—93.7 |
| 2,825,721 | 3/1958 | Hogan et al. | 260—93.7 |
| 3,197,452 | 7/1965 | Natta et al. | 260—93.7 |

ROBERT F. WHITE, Primary Examiner

J. R. THURLOW, Assistant Examiner

U.S. Cl. X.R.

260—94.9; 264—28, 210, 346